US008462997B2

(12) United States Patent
Pettit et al.

(10) Patent No.: US 8,462,997 B2
(45) Date of Patent: Jun. 11, 2013

(54) USER-SPECIFIC ATTRIBUTE CUSTOMIZATION

(75) Inventors: Bradley Robert Pettit, Los Gatos, CA (US); Eric Soldan, Saratoga, CA (US); Nosherwan Minwalla, Sunnyvale, CA (US); Alan Bishop, Campbell, CA (US); Nicolae Surpatanu, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 12/883,010

(22) Filed: Sep. 15, 2010

(65) Prior Publication Data

US 2012/0063649 A1 Mar. 15, 2012

(51) Int. Cl.
*G06K 9/00* (2006.01)
(52) U.S. Cl.
USPC .......................................................... 382/118
(58) Field of Classification Search
USPC ........................ 382/115, 118, 181, 209, 218
See application file for complete search history.

(56) References Cited

U.S. PATENT DOCUMENTS

| 6,530,083 | B1* | 3/2003 | Liebenow | 725/46 |
| 7,424,267 | B2 | 9/2008 | Eisenbach | |
| 2009/0044113 | A1 | 2/2009 | Jones et al. | |
| 2009/0215533 | A1* | 8/2009 | Zalewski et al. | 463/32 |
| 2009/0285454 | A1* | 11/2009 | Xu | 382/118 |
| 2010/0103316 | A1 | 4/2010 | Colsey et al. | |
| 2012/0054634 | A1* | 3/2012 | Stone et al. | 715/745 |

OTHER PUBLICATIONS

"International Search Report", Mailed Date: Mar. 26, 2012, Application No. PCT/US2011/047813, Filed Date: Aug. 15, 2011, pp. 9.
Yoon, et al., "Design and Implementation of a Universal Appliance Controller Based on Selective Interaction Modes", Retrieved at <<http://ieeexplore.ieee.org/xpl/login.jsp?tp=&arnumber=4711226&url=http%3A%2F%2Fieeexplore.ieee.org%2Fxpls%2Fabs_all.jsp%3Farnumber%3D4711226>>, IEEE Transactions on Consumer Electronics, vol. 54, No. 4, Nov. 2008, 1722-1729.
Shin, et al., "User-Centric Conflict Management for Media Services Using Personal Companions", Retrieved at <<etrij.etri.re.kr/Cyber/servlet/GetFile?fileid=SPF-1181269462566>>, ETRI Journal, vol. 29, No. 3, Jun. 2007, pp. 311-321.
Yoon, et al., "Design and Implementation of a Universal Appliance Controller Based on Selective Interaction Modes—Published Date: Nov. 2008", Retrieved at <<http://ieeexplore.ieee.org/stamp/stamp.jsp?tp=&arnumber=4711226>>, IEEE Transactions on Consumer Electronics, vol. 54, No. 4, Nov. 2008, p. 1722-1729.

(Continued)

*Primary Examiner* — Daniel Mariam
(74) *Attorney, Agent, or Firm* — Alleman Hall McCoy Russell & Tuttle LLP

(57) ABSTRACT

User-specific attribute customization is provided by an entertainment system including a user identification module to identify one or more users within an operative range of the entertainment system, and a dominant attribute module to automatically express exclusive user-specific attributes of a dominant user when the dominant user is one of two or more identified users within the operative range of the entertainment system. The entertainment system further includes a cooperative attribute module to automatically express merged user-specific attributes of a first user and a second user when the first user and the second user are two of two or more identified users within the operative range of the entertainment system.

20 Claims, 4 Drawing Sheets

OTHER PUBLICATIONS

Albanesius, Chloe, "Google Unveils Google TV with Sony, Logitech, Intel as Partners", Retrieved at <<http://www.pcmag.com/article2/0,2817,2364007,00.asp>>, May 20, 2010, pp. 7.

"Sneak peek: LGs Autumn 2008 LCD TV line-up: LG4000, LG7000, Slimline Scarlet, LG future plans", Retrieved at <<http://www.hdtvuk.tv/2008/08/sneak_peek_lgs.html>>, Aug. 29, 2008, pp. 4, Oct. 9, 2012.

Senot, Christophe, "Turning TV watching into a personalized interactive experience", Retrieved at <<http://www.itea2.org/attachments/573/innovation_report_wellcom.pdf>>, Dec. 2009, p. 24-25.

Cheng, Jacqui, "Android-based Google TV coming to living rooms this fall", Retrieved at <<http://arstechnica.com/gadgets/news/2010/05/android-based-google-tv-coming-to-living-rooms-this-fall.ars>>, Jun. 17, 2010, pp. 2.

Shin, et al., "User-Centric Conflict Management for Media Services Using Personal Companions", Retreived at <<http://etrij.etri.re.kr/Cyber/Download/PublishedPaper/2903/29-03-07_(311-321).pdf>>, ETRI Journal, vol. 29, No. 3, Jun. 2007, p. 311-321.

\* cited by examiner

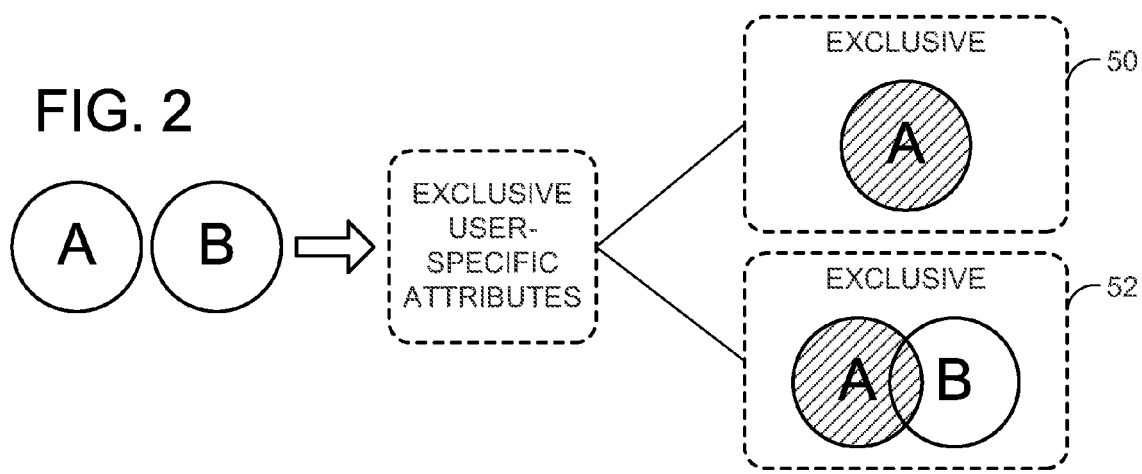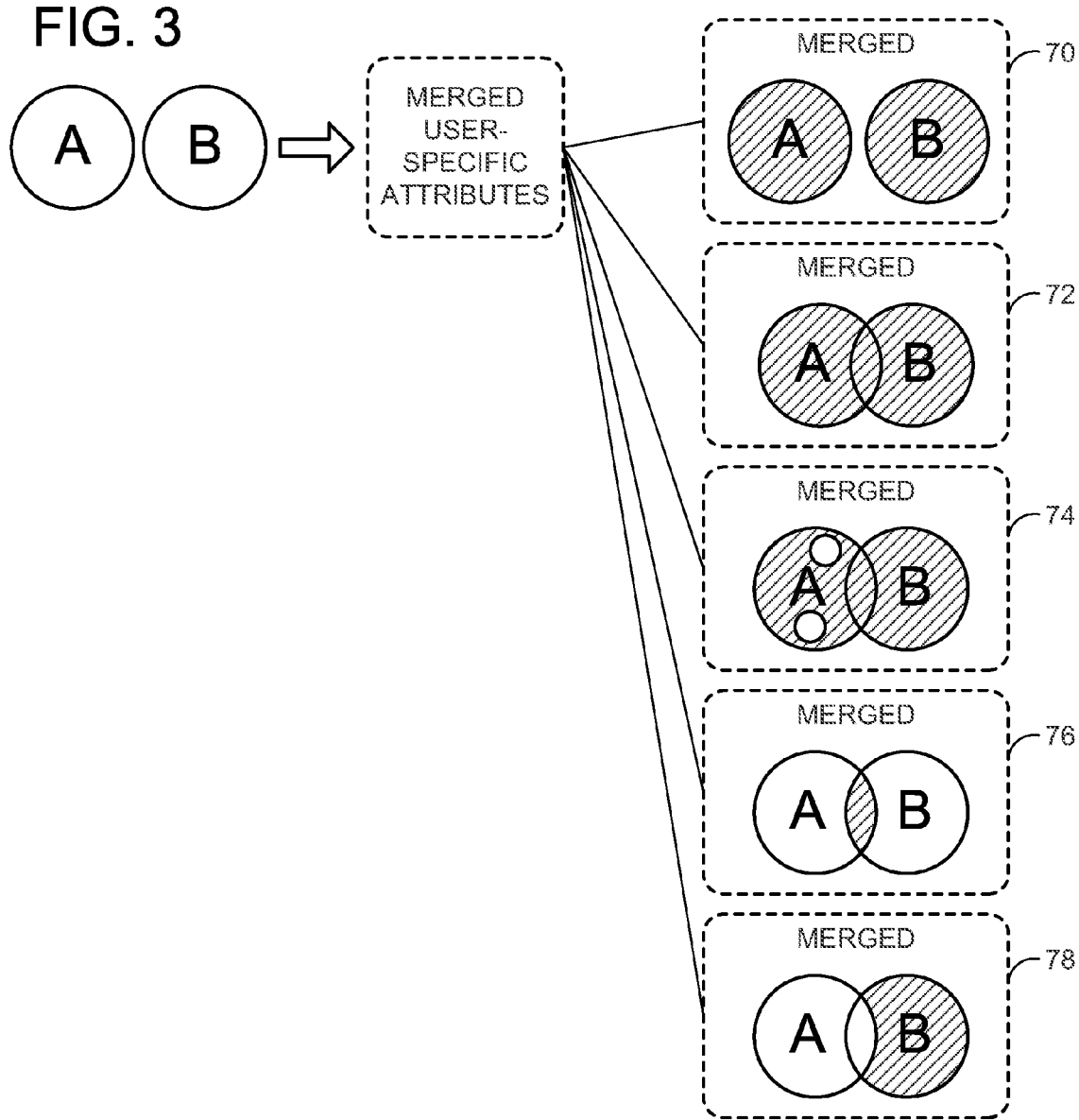

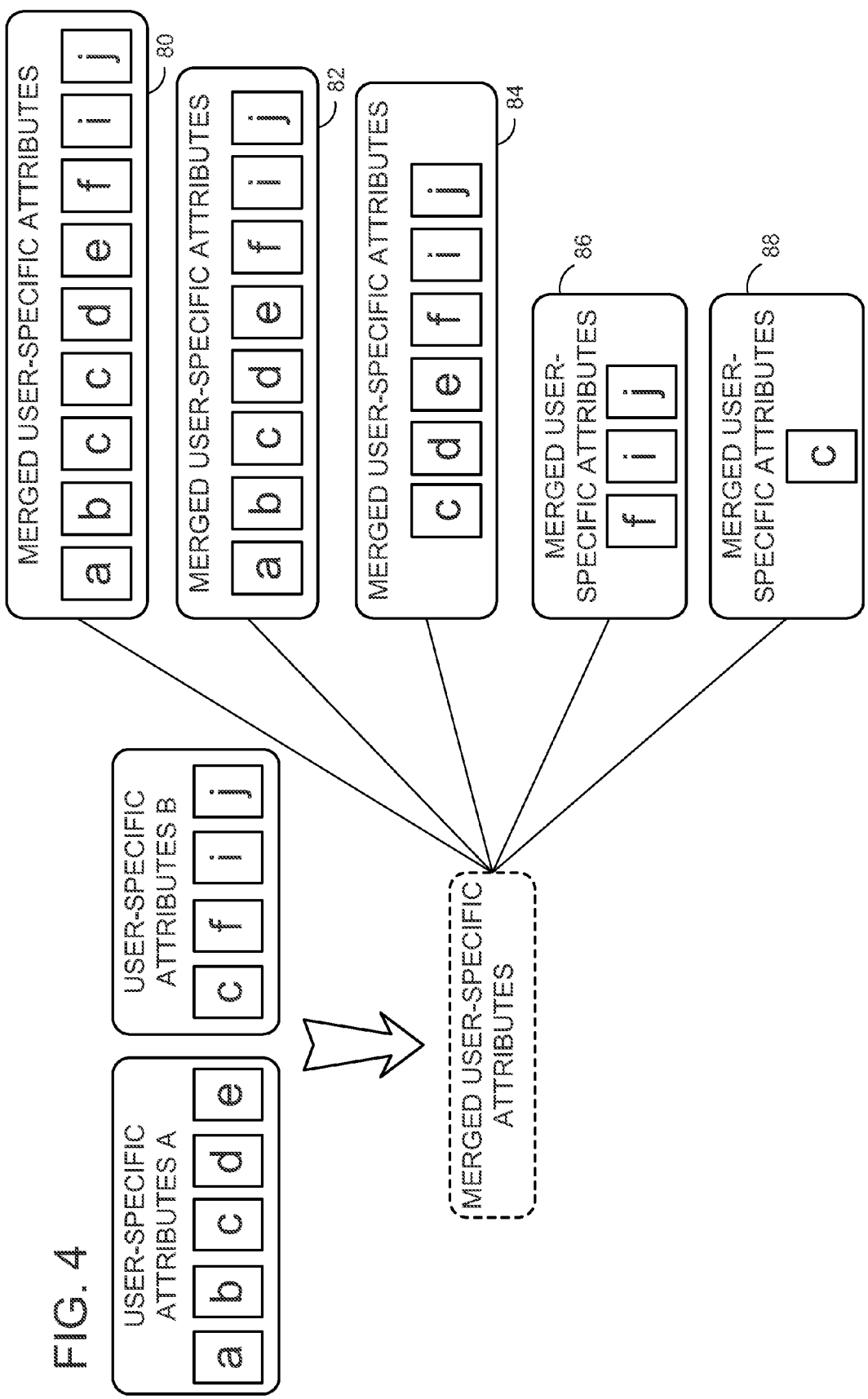

USER-SPECIFIC ATTRIBUTE CUSTOMIZATION

BACKGROUND

Entertainment systems may be used to present a variety of different types of content, such as movies, television, music, photographs, interpersonal communications, social networking, etc. as well as conventional computer applications. Further, different users may use an entertainment system in different ways. As such, it is desirable to customize the user experience to better accommodate one or more particular users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of this disclosure, an entertainment system is provided. The entertainment system includes a user identification module to identify one or more users within an operative range of the entertainment system, and a dominant attribute module to automatically express exclusive user-specific attributes of a dominant user when the dominant user is one of two or more identified users within the operative range of the entertainment system. The entertainment system further includes a cooperative attribute module to automatically express merged user-specific attributes of a first user and a second user when the first user and the second user are two of two or more identified users within the operative range of the entertainment system.

BRIEF DESCRIPTION OF THE DRAWINGS

FIG. 2 schematically shows an example of exclusive user-specific attribute selection in accordance with an embodiment of the present disclosure.

FIG. 3 schematically shows an example of merged user-specific attribute selection in accordance with an embodiment of the present disclosure.

FIG. 4 schematically shows an example of merged list item selection in accordance with an embodiment of the present disclosure.

DETAILED DESCRIPTION

An entertainment system may be used to view and interact with content. As such, an entertainment system may include a display device and/or other devices such as a set-top box, a media disc player, a gaming console, a personal computer, etc. Entertainment systems may be used by a variety of different users. In some cases, multiple users may cooperatively use the same entertainment system. As described herein, an entertainment system may be configured to identify users, so as to provide a customized experience to the identified users.

Further, the entertainment system may be configured to identify users automatically. In this way, users need not provide login information, for example. Rather, upon identifying the users, the entertainment system may automatically provide a customized experience based on the identified users.

Figure 1:
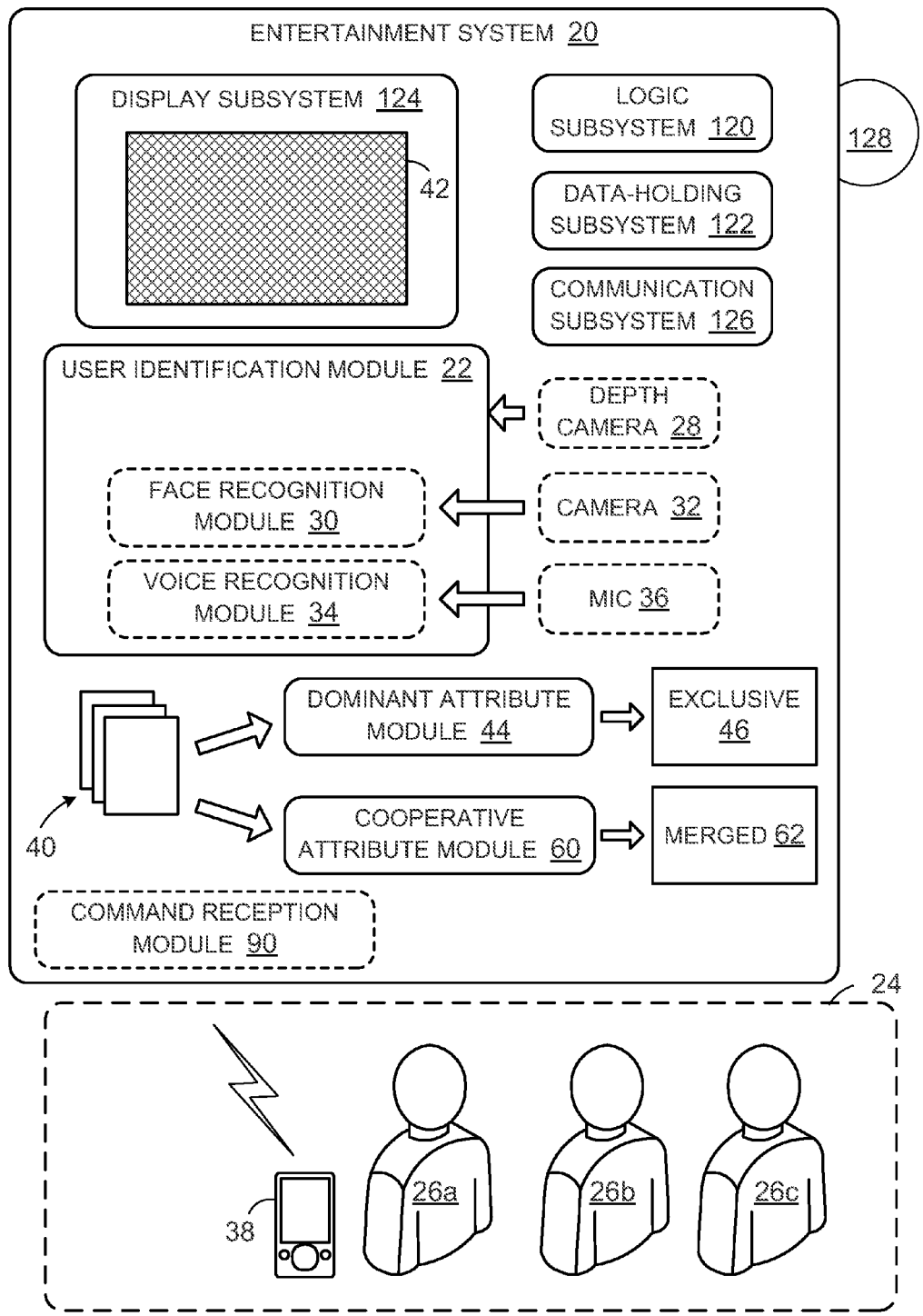
FIG. 1 shows an example use environment for an entertainment system in accordance with an embodiment of the present disclosure.

FIG. 1 illustrates an example entertainment system 20 which may be used by various users. Entertainment system 20 may further comprise a user identification module 22 to identify user(s) within an operative range 24 of entertainment system 20, such as user 26a, user 26b and/or user 26c. It should be appreciated that the operative range may be any suitable operative range, and operative range 24 as illustrated in FIG. 1 is not intended to be limiting in any way.

User identification module 22 may be configured to identify user(s) in any suitable manner. For example, in some embodiments, user identification module 22 may be configured to identify user(s) in an observed depth image received from a depth camera. As an example, entertainment system 20 may include a depth camera 28 that is configured to capture depth information. In such a case, operative range 24 may be based on a range of depth camera 28. User identification module 22 may utilize the observed depth image in any suitable manner, such as by analyzing the depth image for selected features.

In some embodiments, user identification module 22 may include additional and/or alternative modules to aid in user identification. As an example, user identification module 22 may include a face recognition module 30 to identify user(s) in an observed image received from a camera such as camera 32 or depth camera 28. In such a case, operative range 24 may be based on a field of view of camera 32. Face recognition module 30 may identify a user's face in any suitable manner, such as by analyzing the obtained image and comparing selected facial features from the image to known information.

As another example, user identification module 22 may include a laser scanner configured to identify a user.

As another example, user identification module 22 may include a voice recognition module 34 to identify user(s) in an audio segment received from a microphone, such as microphone 36. In such a case, operative range 24 may be based on a range of microphone 36. Voice recognition module 34 may identify a user's voice in any suitable manner, such as by analyzing the audio segment and comparing selected features to known information.

Further, in some cases user identification module 22 may additionally or alternatively be configured to identify each user by wirelessly communicating with a companion device associated with that user. As an example, FIG. 1 illustrates an example companion device 38 associated with user 26a. As a nonlimiting example, companion device 38 may be a mobile communication device configured to wirelessly pair with entertainment system 20. In some cases, wireless communication with the companion device may occur automatically, for example, without interaction of the user. As nonlimiting examples, user identification module 22 may include a Bluetooth radio, a Wi-Fi radio, an IR transmitter/receiver, an RF radio, and/or an RFID sensor for wirelessly identifying companion device 38. Because many companion devices are personal to a specific user and typically carried by that particular user, the identification of a user may be accurately inferred when a companion device is identified.

It should be appreciated that these examples are nonlimiting, and user identification module 22 may be configured to identify users in any other suitable manner.

Upon identifying the users, entertainment system 20 may be configured to provide a customized user experience to the identified users. The user experience may be customized in any suitable way. In some embodiments the appearance of content presented to the user(s) may be customized. In some embodiments, the content itself that is selected for presentation to the user(s) may be customized. As used herein, any such aspect of the user experience that may be customized are referred to as user-specific attributes. FIG. 1 schematically shows such user-specific attributes 40 corresponding to the users. Examples of user-specific attributes that may be customized include display attributes (e.g., background color, font, font size, color settings, etc.), language attributes (e.g., visual and audio), as well as other attributes associated with content of entertainment system 20 (e.g., channels or programs in a programming guide, photographs in a digital album, songs in a digital library, contacts in an address book, bookmarks, applications, etc.). As used herein, the term "channels" is used to broadly refer to any particular source of content, and includes, but is not limited to, over-the-air network television channels, cable television channels, satellite television channels, Internet television channels, over-the-air radio channels, satellite radio channels, Internet radio channels, on-demand content sources, and the like.

The user experience may be customized according to such user-specific attributes in any suitable manner. For example, upon identifying a user, the entertainment system may obtain attributes associated with that user which can then be used in providing the customized user experience. In some embodiments, such user attributes may be stored locally at entertainment system 20, remotely via a network-accessible service, and/or personally via that user's companion device.

Such attributes may indicate restrictions such as parental controls to be applied when customizing the user experience. As one example, parental controls may indicate content that is to be blocked when their child is present (e.g., identified in operative range 24 by entertainment system 20). As another example, parental controls may indicate content that may only be displayed if the parent is present, and is to be removed from display, for example, when the parent leaves the operative range 24 of entertainment system 20.

Further yet, entertainment system 20 may be configured to utilize default attributes if entertainment system 20 is unable to identify a user within operative range 24.

It should be appreciated that these examples are nonlimiting, and entertainment system 20 may be configured to access attributes associated with user-specific attributes in any suitable manner.

Further, entertainment system 20 may be configured to determine customizations based on which users are identified, and what types of attributes are associated with these users, in any suitable manner. In particular, when two or more users are identified within operative range 24, entertainment system 20 may be configured to customize the experience depending on which users are identified. For example, the entertainment system may be configured to customize the user experience to accommodate merged attributes of multiple users. That is, the entertainment system will not simply override the user-specific attributes of one user in favor of the user-specific attributes of another user, but will instead merge the user-specific attributes of both users to provide a user experience that is customized for both users. In some embodiments, a particular type of attribute may not merge in a desirable manner (e.g., unary attributes such as different background colors or different languages for the audio output). In such cases, the user-specific attributes of a single user, herein referred to as a dominant user, may be selected. In some embodiments, the entertainment system may be configured to exclusively select user-specific attributes of the dominant user in other scenarios.

Accordingly, entertainment system 20 may further include a dominant attribute module 44 to automatically express exclusive user-specific attributes 46 of the dominant user when the dominant user is one of two or more identified users within operative range 24. As a nonlimiting example, exclusive user-specific attributes may include user interface attributes. FIG. 2 schematically shows an example of exclusive user-specific attribute selection for user-specific attributes associated with two identified users, namely Attributes A associated with a dominant user, and Attributes B associated with another identified user. Since the entertainment system has determined that a dominant user is present in the operative range, exclusive user-specific attributes are automatically expressed, so as to customize the user experience for the dominant user. As shown at 50, the exclusive user-specific attributes may include only Attributes A. However, in some cases, overlap may exist between the dominant user and the other user, and thus Attributes A of the dominant user will take priority with respect to overlapped attributes, as shown at 52. In some embodiments, the dominant user may be selected based on an aspect of a profile associated with the user (e.g., a dominance selection, a priority ranking, etc.); however, in some embodiments, a dominant user may be assigned by the entertainment system (e.g., the first user to be identified during a particular session with the entertainment system).

Returning to FIG. 1, entertainment system 20 may further include a cooperative attribute module 60 to automatically express merged user-specific attributes 62 of at least a first user and a second user when the first user and the second user are two of two or more identified users within operative range 24. As nonlimiting examples, merged user-specific attributes may include list items such as channels, saved media items, network-accessible media items, etc.

Cooperative attribute module 60 may automatically express the merged user-specific attributes in any suitable manner. For example, in some embodiments, cooperative attribute module 60 may automatically express the merged user-specific attributes as a cooperative program guide including a subset of available media items. In this way, the program guide is customized for media items appealing to the identified users.

As described in more detail hereafter, cooperative attribute module 60 may be configured to express the merged user-specific attributes as a cooperative union of selected attributes. In this way, user-specific aspects may be selected so as to customize the experience in a merged manner for both users.

FIG. 3 schematically shows an example of merged user-specific attribute selection for user-specific attributes associated with two identified users, namely Attributes A associated with a first identified user, and Attributes B associated with a second identified user. The attributes associated with each of the identified users may be merged in any suitable way. For example, as shown at 70, the merged user-specific attributes may be expressed as a cooperative union in which all user-specific attributes from the first user and the second user are combined. In this way, the user-specific attributes of the first user are utilized to customize the experience, as well as the user-specific attributes of the second user.

As shown at 72, the merged user-specific attributes may be expressed as a cooperative union without duplicates. In such a case, all user-specific attributes from the first user are combined with all user-specific attributes from the second user except those user-specific attributes of the second user that duplicate user-specific attributes from the first user. In this way, if identified users have duplicated user-specific attributes, the user experience is customized in a way to incorporate these attributes once instead of twice.

As yet another example, the merged user-specific attributes may be expressed as a cooperative union with exceptions, as indicated at 74. In such a case, user-specific attributes from the first user are combined with user-specific attributes from the second user while excluding some user-specific attributes of the first user. These excluded user-specific attributes may be excluded because of a predetermined criteria that is triggered by the second user. As a nonlimiting example, the first identified user may be a parent which has user-specific attributes associated with all types of content, including content not suitably rated for children. As a possible use scenario, a child walking into the room may be identified by the entertainment system as a non-adult second user. The presence of the non-adult second user may trigger the content not suitable for children to be restricted. As such, the user experience is customized for the parent and the child.

While exclusions are described above in the context of a cooperative union, it is to be understood that exclusions may be applied to any attribute selection.

Continuing with FIG. 3, as shown at 76, the merged user-specific attributes may be expressed as a cooperative intersection in which only user-specific attributes from both the first user and the second user are combined. In this way, the user experience is customized for the first and second user to emphasize overlapping user-specific attributes. As a nonlimiting example, the cooperative intersection may include channels or programs for a programming guide which are preferred by both users and may exclude channels or programs preferred by only one of the two users.

As yet another example, the merged user-specific attributes may be expressed as a discovery complement, as shown at 78. In such a case, only those user-specific attributes from the second user that are not also from the first user are expressed. In this way, the customization of the user experience provides a discovery experience for the first user in that the first user is being exposed to new user-specific attributes, namely those associated with the other user.

As introduced above, in some embodiments, user-specific attributes may include list items such as channels, saved media items (e.g., movies, songs, photographs, games, etc. saved locally), network-accessible media items (e.g., movies, songs, photographs, games, etc. saved remotely), etc.

FIG. 4 schematically shows example selection of merged list items in accordance with the merging options described above with reference to FIG. 3. In the depicted example, the user-specific attributes associated with a first user, User A, include list items "a," "b," "c," "d" and "e." The user-specific attributes associated with a second user, User B, include list items "c," "f," "i" and "j." The entertainment system may be configured to merge the list items of the two identified users in any suitable manner. For example, the list items may be merged as a cooperative union, as shown at 80. As another example, as shown at 82, the list items may be merged as a cooperative union without duplicates. In this way, list item "c" which is included in the user-specific attributes of both User A and User B avoids duplication. As yet another example, as shown at 84, the list items may be merged as a cooperative union with exceptions, such as to exclude list items "a" and "b," for example. Further, as shown at 86, the list items may be merged as a discovery complement to expose User A to new list items of User B, such as list items "f," "i" and "j." As yet another example, as shown at 88, the list items may be merged as a cooperative intersection to include only the list items common to User A and User B, namely, list item "c." It should be appreciated that these examples are not intended to be limiting in any way. Attributes may be merged to achieve any desired type of customization.

Thus, the entertainment system can customize the user experience in any of a number of different ways so as to adapt to the identified users. In this way, a customized user experience may be dynamically created based on which users are present, whether any of the users are a dominant user, whether any exceptions are triggered by a particular user, whether the users have any overlapping attributes, etc.

In some embodiments, users may be categorized according to one or more criteria, and customization may depend on the category of user(s) that are identified. As one example, some users may be categorized as dominant users, either inherently dominant (e.g., specific user always dominant) or conditionally dominant (e.g., first viewer dominant for given session). As another example, a user may be categorized as a friend entity—a user who is recognized by the entertainment system and has attributes that the entertainment system may use to customize a user experience. As another example, a user may be categorized as a stranger entity—a user that cannot be identified by the entertainment system. The entertainment system may be configured to resort to a default mode in the presence of such a stranger entity or the entertainment system may be configured to customize as if the stranger entity was not present. As still another example, a user may be identified as an ignored entity—a user or other entity that is recognized by the entertainment system but whom the entertainment system is configured to ignore (e.g., pets, babies, neighbors, etc.).

Figure 5:
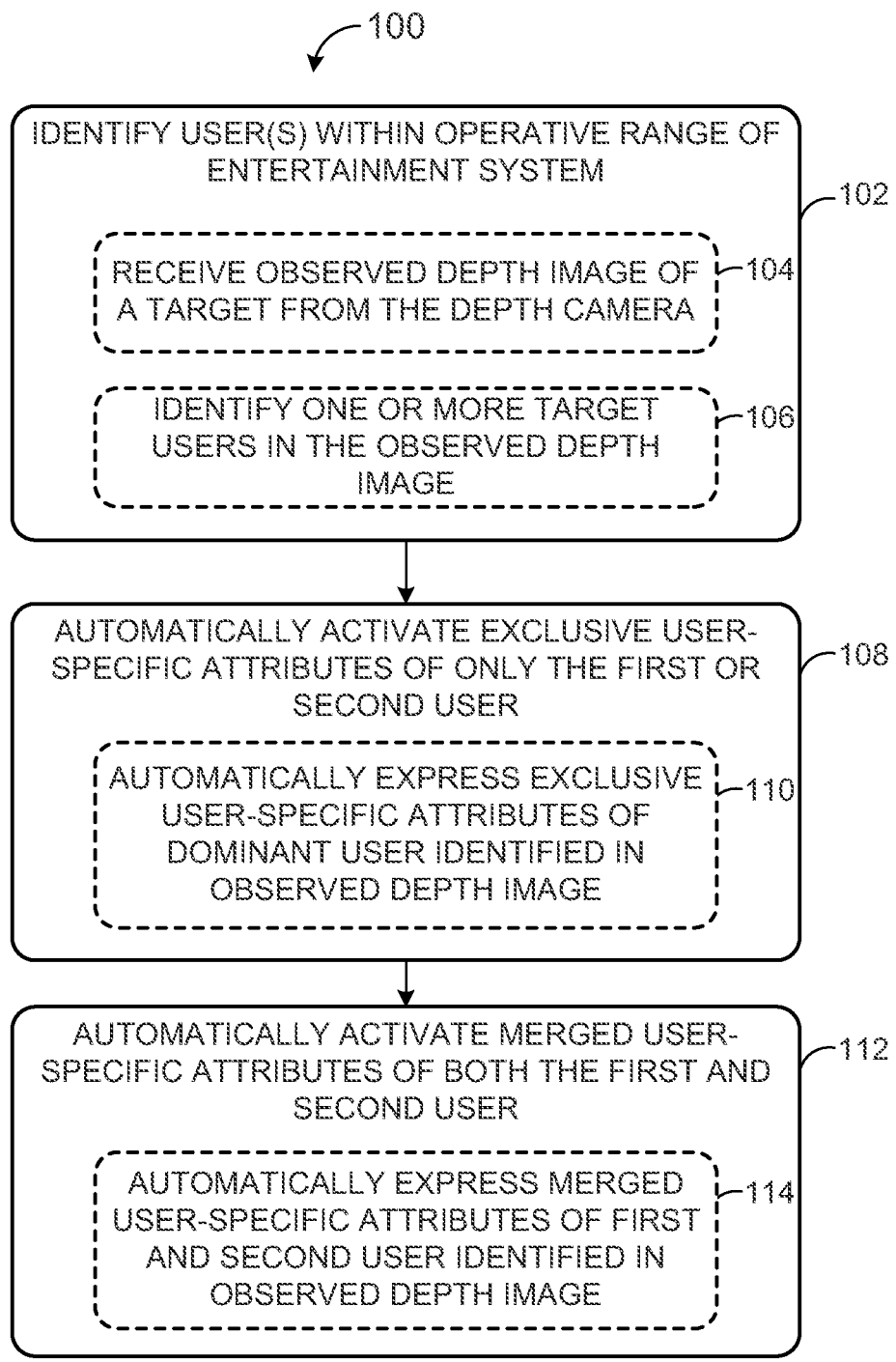
FIG. 5 shows a flow diagram of an example method of resolving user-specific attributes of an entertainment system in accordance with an embodiment of the present disclosure.

Turning now to FIG. 5, FIG. 5 illustrates an example method 100 of resolving user-specific attributes of an entertainment system. At 102, method 100 includes identifying one or more users within an operative range of the entertainment system. In a scenario where two users are present, for example, this may include, identifying a first user within an operative range of the entertainment system and identifying a second user within the operative range of the entertainment system. In some embodiments, method 100 may include receiving an observed depth image of a target from the depth camera and identifying one or more target users in the observed depth image, as indicated at 104 and 106, respectively. In other embodiments, users may be identified by different means.

At 108, method 100 includes automatically activating exclusive user-specific attributes of only the first user or the second user on the entertainment system. For embodiments utilizing an observed depth image, this may include automatically expressing exclusive user-specific attributes of a dominant user when the dominant user is one of two or more identified users present in the observed depth image as indicated at 110.

At 112, method 100 includes automatically activating merged user-specific attributes of both the first user and the second user on the entertainment system. For embodiments utilizing an observed depth image, this may include automatically expressing merged user-specific attributes of a first user and a second user when the first user and the second user are two of two or more identified users present in the observed depth image as indicated at 114.

As introduced above, in some embodiments, user identification module 22 of entertainment system 20 may be configured to identify user(s) in an observed depth image received from a depth camera (e.g., depth camera 28) configured to obtain depth images of one or more targets (e.g., users). The depth camera may be configured to capture video with depth information via any suitable technique (e.g., time-of-flight, structured light, stereo image, etc.). In some embodiments, additional or alternative capture devices may be utilized, such as a video camera, stereo cameras, and/or other suitable capture devices.

For example, in time-of-flight analysis, depth camera 28 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time, via a technique such as shuttered light pulse imaging.

In another example, structured light analysis may be utilized by depth camera 28 to capture depth information. In such an analysis, patterned light (i.e., light displayed as a known pattern such as a grid pattern, a stripe pattern, a constellation of dots, etc.) may be projected onto the target. Upon striking the surface of the target, the pattern may become deformed, and this deformation of the pattern may be studied to determine a physical distance from the capture device to a particular location on the target.

In another example, entertainment system 20 may include two or more physically separated cameras that view a target from different angles to obtain visual stereo data. In such cases, the visual stereo data may be resolved to generate a depth image.

In other embodiments, entertainment system 20 may utilize other technologies to measure and/or calculate depth values. Additionally, depth camera 28 may organize the calculated depth information into "Z layers," i.e., layers perpendicular to a Z axis extending from the depth camera along its line of sight to the viewer.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices and/or entertainment system 20. A capture device may include, for example, one or more onboard processing units configured to perform one or more target analysis and/or tracking functions. A capture device may include firmware to facilitate updating such onboard processing logic.

Once a depth image is generated, regardless of the hardware and/or processing techniques used to generate the depth image, the depth image may be analyzed to identify one or more users. For example, skeletal mapping algorithms may be applied to the depth image so that three-dimensional skeletal models are ascertained for each of the observed users. Such skeletal models may then be compared to a database of known users, so that a user may be identified based on the skeletal model. It is to be understood that such skeletal analysis is one suitable technique for identifying a user, and other techniques may be used without departing from the scope of this disclosure.

Returning to FIG. 1, in some embodiments, entertainment system 20 may further include a command reception module 90 configured to wirelessly receive a remote command from the companion device 38 and change a parameter of entertainment system 20 responsive to the remote command. In this way, the companion device 38 may serve as an input device (i.e., remote control) for interfacing with entertainment system 20. For example, companion device 38 may send a remote command (e.g., "change channel") to the command reception module 90, and upon receiving the remote command, the command reception module can cause entertainment system 20 to change the channel as instructed.

As introduced above, in some embodiments, user identification module 22 of entertainment system 20 may be configured to identify user(s) by inference based on a companion device that is identified as being associated with those users (e.g., companion device 38 of user 26a). This may be done in any suitable manner. As an example, the companion device may recognize the entertainment system and request a token from an attributes source (e.g., a third party service). The token may be sent to the entertainment system from the attributes source, allowing the entertainment system to query elements of the user's attributes while the companion device is present (e.g., auto-expiring after a predetermined time). As another example, the entertainment system may construct a signature based on the user's biometric properties and may request a token from a personalization service. In some embodiments, the entertainment system may subsequently be restricted from accessing a user's attributes, such as after a predetermined duration of time, after the token expires, etc.

Further, such a token need not enable access to all attributes. In other words, the token may enable the entertainment system to access selected attributes associated with the user. The entertainment system may be configured to selectively access attributes in any suitable manner. As an example, the entertainment system may be configured to send a request for signing to the companion device. The companion device may then inspect the request, decide if the request refers to a permitted resource, and send a token back to the entertainment system enabling access to a single resource, as opposed to sending one token for accessing all of the user's attributes.

As yet another example, the companion device may act as a proxy for the entertainment system to access non-public attributes. In such a case, the entertainment system may send a request for all non-public resources to the companion device which then inspects the request and either fails the request or fetches the resource itself using the appropriate authentication mechanisms, and proxies the results back to the entertainment system. In this way, no tokens or authentication information may be provided to the entertainment system, and there may be no predetermined window of time during which the entertainment system can continue to request resources without the companion device being present.

While the token-based exchanges are described above with reference to identification via a companion device, such token based exchanges may be adapted for other identification scenarios. Furthermore, in some embodiments attributes need not be expressed via a token, and may be literally exposed to the entertainment system. As an example, a companion device may publish an entire profile to the entertainment system.

In some embodiments, the above described methods and processes may be tied to an entertainment system including one or more computers. In particular, the methods and processes described herein may be implemented as a computer application, computer service, computer API, computer library, and/or other computer program product.

FIG. 1 schematically shows a nonlimiting entertainment system 20 that may perform one or more of the above described methods and processes. Entertainment system 20 is shown in simplified form. It is to be understood that virtually any computer architecture may be used without departing from the scope of this disclosure. In different embodiments, entertainment system 20 may take the form of one or more mainframe computers, server computers, desktop computers, laptop computers, tablet computers, home entertainment computers, network computing devices, mobile computing devices, mobile communication devices, gaming devices, televisions, etc.

Entertainment system 20 includes a logic subsystem 120 and a data-holding subsystem 122. Entertainment system 20 may optionally include a display subsystem 124, communication subsystem 126, and/or other components not shown in FIG. 1. Entertainment system 20 may also optionally include user input devices such as keyboards, mice, game controllers, cameras, microphones, and/or touch screens, for example. Such components may be part of the same physical machine (e.g., a television), or parts of two or more separate machines (e.g., a television and a set top box).

Logic subsystem 120 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration. Further, logic subsystem 120 may be operatively connected to depth camera 28.

Data-holding subsystem 122 may include one or more physical, non-transitory, devices configured to hold data and/or instructions executable by the logic subsystem to implement the herein described methods and processes. When such methods and processes are implemented, the state of data-holding subsystem 122 may be transformed (e.g., to hold different data).

Data-holding subsystem 122 may include removable media and/or built-in devices. Data-holding subsystem 122 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 122 may include devices with one or more of the following characteristics: volatile, nonvolatile, dynamic, static, read/write, read-only, random access, sequential access, location addressable, file addressable, and content addressable. In some embodiments, logic subsystem 120 and data-holding subsystem 122 may be integrated into one or more common devices, such as an application specific integrated circuit or a system on a chip.

FIG. 1 also shows an aspect of the data-holding subsystem in the form of removable computer-readable storage media 128, which may be used to store and/or transfer data and/or instructions executable to implement the herein described methods and processes. Removable computer-readable storage media 128 may take the form of CDs, DVDs, HD-DVDs, Blu-Ray Discs, EEPROMs, and/or floppy disks, among others.

The terms "module," "program," and "engine" may be used to describe an aspect of entertainment system 20 that is implemented to perform one or more particular functions. In some cases, such a module, program, or engine may be instantiated via logic subsystem 120 executing instructions held by data-holding subsystem 122. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc., as well as the hardware used to execute or otherwise enable such items.

It is to be appreciated that a "service", as used herein, may be an application program executable across multiple user sessions and available to one or more system components, programs, and/or other services. In some implementations, a service may run on a server responsive to a request from a client.

When included, display subsystem 124 may be used to present a visual representation of data held by data-holding subsystem 122. As the herein described methods and processes change the data held by the data-holding subsystem, and thus transform the state of the data-holding subsystem, the state of display subsystem 124 may likewise be transformed to visually represent changes in the underlying data. Display subsystem 124 may include one or more display devices utilizing virtually any type of technology. Such display devices may be combined with logic subsystem 120 and/or data-holding subsystem 122 in a shared enclosure, or such display devices may be peripheral display devices.

When included, communication subsystem 126 may be configured to communicatively couple entertainment system 20 with one or more other computing devices. Communication subsystem 126 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow entertainment system 20 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An entertainment system, comprising:
   a user identification module to identify one or more users within an operative range of the entertainment system;
   a dominant attribute module to automatically express exclusive user-specific attributes of a dominant user when the dominant user is one of two or more identified users within the operative range of the entertainment system; and
   a cooperative attribute module to automatically express merged user-specific attributes of a first user and a second user when the first user and the second user are two of two or more identified users within the operative range of the entertainment system.

2. The entertainment system of claim 1, where the user identification module is configured to identify the one or more users in an observed depth image received from a depth camera.

3. The entertainment system of claim 1, where the user identification module includes a face recognition module to identify the one or more users in an observed image received from a camera.

4. The entertainment system of claim 1, where the user identification module includes a voice recognition module to identify the one or more users in an audio segment received from a microphone.

5. The entertainment system of claim 1, where the user identification module is configured to identify the one or more users by, for each such user, wirelessly communicating with a companion device associated with that user.

6. The entertainment system of claim 5, where the companion device is a mobile communication device configured to wirelessly pair with the entertainment system.

7. The entertainment system of claim 1, where the user identification module is configured to identify an ignored entity, and where the dominant attribute module and the cooperative attribute module are configured to ignore the presence of the ignored entity.

8. The entertainment system of claim 1, where the exclusive user-specific attributes include user interface attributes.

9. The entertainment system of claim 1, where the merged user-specific attributes include list items.

10. The entertainment system of claim 9, where the merged user-specific attributes include channels.

11. The entertainment system of claim 9, where the merged user-specific attributes include saved media items.

12. The entertainment system of claim 9, where the merged user-specific attributes include network-accessible media items.

13. The entertainment system of claim 1, where the cooperative attribute module automatically expresses the merged user-specific attributes as a cooperative program guide including a subset of available media items.

14. The entertainment system of claim 1, where the cooperative attribute module is configured to express the merged user-specific attributes as a cooperative union in which all user-specific attributes from the first user and the second user are combined.

15. The entertainment system of claim 1, where the cooperative attribute module is configured to express the merged user-specific attributes as a cooperative union without duplicates in which all user-specific attributes from the first user are combined with all user-specific attributes from the second user except those user-specific attributes of the second user that duplicate user-specific attributes from the first user.

16. The entertainment system of claim 1, where the cooperative attribute module is configured to express the merged user-specific attributes as a cooperative union with exceptions in which user-specific attributes from the first user are combined with user-specific attributes from the second user while excluding user-specific attributes of the first user having a predetermined criteria that is triggered by the second user.

17. The entertainment system of claim 1, where the cooperative attribute module is configured to express the merged user-specific attributes as a cooperative intersection in which only user-specific attributes from both the first user and the second user are combined.

18. The entertainment system of claim 1, where the cooperative attribute module is configured to express the merged user-specific attributes as a discovery complement in which only those user-specific attributes from the second user that are not also from the first user are expressed.

19. An entertainment system, comprising:
    a depth camera configured to capture depth information;
    a logic subsystem operatively connected to the depth camera; and
    a data-holding subsystem holding instructions executable by the logic subsystem to:
    receive an observed depth image of a target from the depth camera;
    identify one or more target users in the observed depth image;
    automatically express exclusive user-specific attributes of a dominant user when the dominant user is one of two or more identified users present in the observed depth image; and
    automatically express merged user-specific attributes of a first user and a second user when the first user and the second user are two of two or more identified users present in the observed depth image.

20. A method of resolving user-specific attributes of an entertainment system, the method comprising:
    identifying a first user within an operative range of the entertainment system;
    identifying a second user within the operative range of the entertainment system;
    automatically activating exclusive user-specific attributes of only the first user or the second user on the entertainment system; and
    automatically activating merged user-specific attributes of both the first user and the second user on the entertainment system.

* * * * *